(12) United States Patent
McFarlane, Jr. et al.

(10) Patent No.: US 10,335,693 B1
(45) Date of Patent: Jul. 2, 2019

(54) UNIVERSAL CONTROLLER HOLSTER

(71) Applicant: Integr8ted Minds Inc., Miami, FL (US)

(72) Inventors: Michael A. McFarlane, Jr., Miami, FL (US); Jamarcus J. Watkins, Lake Wales, FL (US)

(73) Assignee: Integr8ted Minds Inc., Miami, FL (US)

( * ) Notice: Subject to any disclaimer, the term of this patent is extended or adjusted under 35 U.S.C. 154(b) by 168 days.

(21) Appl. No.: 15/441,360

(22) Filed: Feb. 24, 2017

Related U.S. Application Data (63) Continuation of application No. 29/590,469, filed on Jan. 10, 2017, now Pat. No. Des. 815,829.

(51) Int. Cl.
  *A63F 13/98* (2014.01)
  *A45F 5/02* (2006.01)
  *A45C 13/02* (2006.01)

(52) U.S. Cl.
  CPC ............. *A63F 13/98* (2014.09); *A45C 13/02* (2013.01); *A45F 5/021* (2013.01)

(58) Field of Classification Search
  CPC ........... A63F 13/98; A45C 13/02; A45F 5/021
  USPC .................... D3/215; 224/223, 242
  See application file for complete search history.

(56) References Cited

U.S. PATENT DOCUMENTS

| | | | | | |
|---|---|---|---|---|---|
| 1,212,511 | A | * | 1/1917 | Kropp | A45F 5/02 24/3.12 |
| 2,089,452 | A | * | 8/1937 | Utley | A01K 97/10 248/214 |
| 2,775,804 | A | * | 1/1957 | Ayoub | A45F 5/02 24/3.12 |
| D203,101 | S | * | 12/1965 | Holder | 206/493 |
| 3,999,752 | A | * | 12/1976 | Kupperman | A63B 21/154 482/131 |
| 4,010,744 | A | * | 3/1977 | Boyen | A61F 5/3715 602/32 |
| 4,264,024 | A | * | 4/1981 | Harris, Jr. | A24F 9/14 131/260 |

(Continued)

FOREIGN PATENT DOCUMENTS

EP       1 266 678 A1 * 12/2002 ............. A63F 13/08

*Primary Examiner* — David L Lewis
*Assistant Examiner* — Matthew D Hoel
(74) *Attorney, Agent, or Firm* — Nancy J. Flint, Attorney At Law, P.A.; Nancy J. Flint, Esq.

(57) ABSTRACT

A universal controller holster for holding one- or two-lobed controllers on the person of a user, such as game controllers is disclosed. The universal controller holster is adjustable and designed to hold on the person of a user most controllers that are commercially available. The universal controller holster comprises two collars connected together by an arm and further to a spine having an angled tooth at one end. The spine is adjustably fastenable to a mount having a plurality of detents to which the angled tooth of the spine can be attached, thus adjusting the height of the mount to accommodate the size of various controllers. The universal controller holster further comprises a clip that can be used to attach the holster to a user such as the waist band of slacks or a belt, or can be used to attach to other items such as a purse or any other item. The universal controller holster allows for the user to hold the controller hands-free while moving and changing locations.

17 Claims, 11 Drawing Sheets

(56) References Cited

U.S. PATENT DOCUMENTS

| | | | | |
|---|---|---|---|---|
| 4,494,754 A | * | 1/1985 | Wagner, Jr. | A63F 13/02 108/43 |
| 4,648,603 A | * | 3/1987 | Hayford, Jr. | A63F 13/02 108/43 |
| 4,715,293 A | * | 12/1987 | Cobbs | A47B 23/002 108/43 |
| 5,207,791 A | * | 5/1993 | Scherbarth | A63F 13/08 224/270 |
| 5,258,017 A | * | 11/1993 | Myers | A61H 1/0218 482/131 |
| 5,325,991 A | * | 7/1994 | Williams | A45F 5/02 215/12.1 |
| 5,469,607 A | * | 11/1995 | Henningsson | A01G 9/22 24/716 |
| 5,535,928 A | * | 7/1996 | Herring | A45F 5/02 224/250 |
| 5,588,941 A | * | 12/1996 | Scott | A61H 1/0218 482/131 |
| 5,678,741 A | * | 10/1997 | Schieber | B60N 3/004 108/44 |
| 5,711,433 A | * | 1/1998 | Smith | A47G 7/044 211/113 |
| 5,755,474 A | * | 5/1998 | Slomski | B65D 71/504 206/150 |
| 5,764,164 A | * | 6/1998 | Cartabiano | A63F 13/06 273/148 B |
| D396,495 S | * | 7/1998 | Hirokane | D21/385 |
| 5,941,434 A | * | 8/1999 | Green | A45F 5/02 224/195 |
| 5,992,624 A | * | 11/1999 | Hodson | B25H 3/00 206/372 |
| 6,120,025 A | * | 9/2000 | Hughes, IV | A63F 13/02 273/148 B |
| 6,213,363 B1 | * | 4/2001 | Norberg | F16M 13/04 224/185 |
| 6,290,228 B1 | * | 9/2001 | Roberts | A63F 13/08 273/148 B |
| 6,384,810 B1 | * | 5/2002 | Selker | G06F 1/163 345/156 |
| 6,412,741 B1 | * | 7/2002 | Olivero | A47G 23/0225 248/311.2 |
| D464,996 S | * | 10/2002 | Hussaini | D21/333 |
| D467,069 S | * | 12/2002 | TenHoeve | D3/218 |
| D467,621 S | * | 12/2002 | Ku | D14/454 |
| 6,530,570 B2 | * | 3/2003 | Ku | A63F 13/02 273/148 B |
| D515,807 S | * | 2/2006 | Faillace | D3/218 |
| D521,567 S | * | 5/2006 | Svendsen | D14/401 |
| 7,073,758 B2 | * | 7/2006 | Whittemore | E04G 21/30 24/338 |
| 7,099,710 B1 | * | 8/2006 | Faillance | A45F 5/00 455/575.1 |
| D534,962 S | * | 1/2007 | Svendsen | D14/401 |
| 7,161,086 B2 | * | 1/2007 | Torcivia | A45F 5/00 174/135 |
| D570,854 S | * | 6/2008 | Harris | D14/454 |
| D578,167 S | * | 10/2008 | Harris | D14/401 |
| D587,717 S | * | 3/2009 | Harris | D14/454 |
| 7,588,225 B2 | * | 9/2009 | Wawerski | B44D 3/14 16/425 |
| 7,665,641 B2 | * | 2/2010 | Kaufman | A45F 3/14 224/261 |
| 7,722,508 B2 | * | 5/2010 | Hetrick | A63B 21/0023 482/139 |
| 7,833,097 B1 | * | 11/2010 | Maddox | A63F 13/23 455/556.1 |
| 8,485,406 B2 | * | 7/2013 | Huh | A45F 5/021 224/241 |
| 8,794,560 B2 | * | 8/2014 | Salentine | A45F 5/004 242/379.2 |
| 8,964,364 B2 | * | 2/2015 | Abdelsamie | G06F 1/1628 361/679.03 |
| 9,358,415 B2 | * | 6/2016 | Champion | A63B 21/151 |
| 9,570,249 B1 | * | 2/2017 | Douglas | H01H 9/025 |
| 10,029,136 B2 | * | 7/2018 | Aldridge | A61H 1/0237 |
| 2002/0195771 A1 | * | 12/2002 | Ku | A63F 13/02 273/148 B |
| 2004/0089688 A1 | * | 5/2004 | Perez | A45F 5/00 224/666 |
| 2006/0246963 A1 | * | 11/2006 | Tages | A45F 5/02 455/575.1 |
| 2009/0227381 A1 | * | 9/2009 | Snavely, II | A63F 13/02 463/47 |
| 2012/0244944 A1 | * | 9/2012 | Kotkin | A63F 13/98 463/38 |
| 2016/0262527 A1 | * | 9/2016 | Xu | A45F 5/021 |

* cited by examiner

UNIVERSAL CONTROLLER HOLSTER

FIELD OF THE INVENTION

The invention relates to a universal controller holster for holding one- or two-lobed controllers on the person of a user, such as game controllers. The universal controller holster of the invention is adjustable and designed to hold on the person of a user most controllers that are commercially available. The universal controller holster comprises two collars connected together by an arm and further to a spine having an angled tooth at one end. The spine is adjustably fastenable to a mount having a plurality of detents to which the angled tooth of the spine can be attached, thus adjusting the height of the mount to accommodate the size of various controllers. The universal controller holster further comprises a clip that can be used to attach the holster to a user such as the waist band of slacks or a belt, or can be used to attach to other items such as a purse or any other item. The universal controller holster of the invention allows for the user to hold the controller hands-free while moving and changing locations.

BACKGROUND OF THE INVENTION

Most game controllers comprise a standardized two-lobed handheld configuration with a left-hand lobe, right-hand lobe, and central portion, all having an array of face-mounted controls. Despite this limited degree of uniformity, a wide variety of game controllers exist in a wide variety of configurations. For example, some are wired versus wireless, placement of controls can vary, and dimensions differ from model to model, etc.

There are currently a variety of controller covers offered as accessories to accommodate a two-lobed controller.

U.S. Design Pat. No. D521567 to Svendsen et al. discloses an ornamental cover for a game controller with opposing lobe-holsters and a central strap that clips over the main body of the controller.

U.S. Published Patent Appln. No. US 2008/0122173 to Harris discloses a form-fitting electronic game controller cover comprising a two-lobed holster contoured to fit a common two-lobed handheld controller configuration.

U.S. Published Patent Appln. No. 20150190720 to Buller discloses a holder for a game controller to allow the game controller to sit in a vertical position on a stand or holster for storage.

SUMMARY OF THE INVENTION

The invention relates to a universal controller holster for holding one- or two-lobed controllers on the person of a user, such as game controllers. The universal controller holster of the invention is adjustable and designed to hold on the person of a user most one- or two-lobed controllers that are commercially available. The universal controller holster comprises two collars connected together by an arm and further to a spine having an angled tooth at one end. The spine is adjustably fastenable to a mount having a plurality of detents to which the angled tooth of the spine can be attached, thus adjusting the height of the mount to accommodate the size of various controllers. The universal controller holster further comprises a clip that can be used to attach the holster to a user such as the waist band of slacks or a belt, or can be used to attach to other items such as a purse or any other item. The universal controller holster of the invention allows for the user to hold the controller hands-free while moving and changing locations.

The holster of the invention is adaptable to accommodate and hold a wide range of controllers including the Xbox 360™, Nintendo Wii™, PlayStation 3™, PC, Mac, Wii U, Xbox One, PS4 Pro, Xbox One S, PS4 Slim, Apple iOS and Android, Smart TV Remotes, Tablets, Smart Phones, TV Boxes and Laptop controllers, among others, either cable or wireless versions, that have at least one lobe that fits into a collar of the universal holster.

According to one embodiment of the invention, a universal holster for a game controller comprises a universal two-collar controller holster having two open collars to accommodate a left-hand lobe and a right-hand lobe of a controller, the two open collars attached by an arm wherein the arm is connected to a spine. An angled tooth is disposed at the end of the spine that is distal from the arm. The universal holster further comprises a mount comprising a plurality of detents. The angled tooth of the spine can be releasably fastened to one of the detents on the mount to adjust the height of the universal holster as selected by the user of the universal holster.

The universal holster further comprises an engagement device to attach the universal holster to the user or an item associated with the user. For example, the user may engage the universal holster with a waist band, pocket or belt of his/her clothing, or an item such as a wallet or a purse.

BRIEF DESCRIPTION OF THE DRAWINGS

Objects, features, and advantages of the invention will be described in the following detailed description and in view of the drawings in which like elements are indicated by like numerals.

DETAILED DESCRIPTION OF THE INVENTION

The invention relates to a universal controller holster for holding one- or two-lobed controllers on the person of a user, such as game controllers. The universal controller holster of the invention is adjustable and designed to hold on the person of a user most one- or two-lobed controllers that are commercially available. The universal controller holster comprises two collars connected together by an arm and further to a spine having an angled tooth at one end. The spine is adjustably fastenable to a mount having a plurality of detents to which the angled tooth of the spine can be attached, thus adjusting the height of the mount to accommodate the size of various controllers. The universal controller holster further comprises a clip that can be used to attach the holster to a user such as the waist band of slacks or a belt, or can be used to attach to other items such as a purse or any other item. The universal controller holster of the invention allows for the user to hold the controller hands-free while moving and changing locations.

The holster comprises a first element of two open collars connected together by an arm. The collars are disposed on the arm at an angle to allow the lobes of the controller. In one embodiment, the collars are disposed at an angle of 45° with respect to the arm to which they are attached.

The arm is further attached to a spine that extends from approximately the center of the arm between the two collars at a 90° angle. An angled tooth is disposed at the end of the spine distal the point of connection of the spine with the arm.

The holster comprises a second element of a mount comprising a plurality of angled detents sized to mate with the angled tooth disposed on the spine of the first element. The angled tooth, when releasably mated with one of the angled detents on the mount, causes the mount to be disposed at substantially a right angle with respect to the spine.

The second element further comprises an angled support arm attached to the mount with a lip disposed on the end of the angled support arm distal from the mount. The lip is designed to engage the top end of a controller between the lip and the mount, under the angled support arm. The length of the mount can be adjusted to accommodate the controller by determining which angled detent to engage with the angled tooth. The second element is designed such that application of force to the lip out and away from the direction of the mount causes the opening of each of the angled detents to expand slightly and to permit insertion of the angled tooth into the desired detent. Release of the force from the lip causes the detents to close, thus releasably attaching the first element to the second element.

The universal controller holster can be constructed in a variety of manners and work for its intended purpose as will be apparent to a person skilled in the art. For example, various parts of the universal controller holster may be connected using magnets such as the arm with collars and the spine. The height of the mount may be changed through an adjustment mechanism such as a sliding mechanism. One skilled in the art can devise numerous methods of connecting the parts of the universal controller holster and the invention is not limited to any particular connection method or methods.

In one embodiment, the mount comprises two (2) angled detents. Detents may be angled to the specifications of the user.

The second element further comprises an attachment clip that can be used to attach the universal controller holster to a user such as the waist band of slacks or a belt, or can be used to attach to other items such as a purse or any other item. The holster of the invention allows for the user to hold the controller while moving and changing locations.

The second element further comprises a pass-through on the top of the angled support arm to accommodate a wire element attached to the controller if any.

The holster of the invention is adaptable to accommodate and hold a wide range of controllers including the Xbox 360™, Nintendo Wii™, PlayStation 3™, PC, Mac, Wii U, Xbox One, PS4, PS4 Pro, Xbox One S, PS4 Slim, Apple iOS and Android, Smart TV Remotes, Tablets, Smart Phones, TV Boxes and Laptop controllers, among others, either cable or wireless versions, that have at least one lobe that fits into a collar of the universal holster.

The universal controller holster is manufactured from materials that allow sufficient flexibility to allow the angled tooth of the first element to engage and disengage with the detents on the mount of the second element, and to allow the lip to engage with the top of a one- or two-lobed controller. Further the universal controller holster attachment clip is made of a material that provides sufficient flexibility to attach the holster to a user's clothing or adjacent article. The universal controller holster may be manufactured from any material desired, including not limited to composite materials, wood and wood-containing products, ceramics including porous ceramics, metals including magnesium, aluminum, titanium, stainless/mild steel, cast iron, alloy steels, zinc, brass, nickel, copper, gold, and lead and including their alloys, polymers, rubbers, foams and glass. There are many other factors still to be considered, particularly manufacturing methods. One skilled in the art can select a suitable material depending on the purpose. For example, certain materials such as metals may be desired for light, stiff components of the holster. Other materials may be suitable for certain components of the holster. For example, a flexible material is desired for the mount such that force placed on the lip can cause flexing and opening of the angle detents to allow insertion of the angled tooth. Separate components of the universal controller holster may be manufactured from different materials. The processes used to manufacture the holster and its components can be selected by a person having skill in the art in accordance with the invention. Metal shaping processes may include forging, rolling and casting. Polymer shaping may include blow molding and vacuum forming. Composite forming may include hand lay-up. Ceramic processing may include sintering. Machining may include grinding and drilling. Joining may include soldering, gluing and mechanical joining such as by screws. In one embodiment, the universal controller holster is injection molded from acrylonitrile butadiene styrene (ABS). Any transparent elements can be made of polycarbonate and dyes can be used for coloring as desired.

Figure 1:
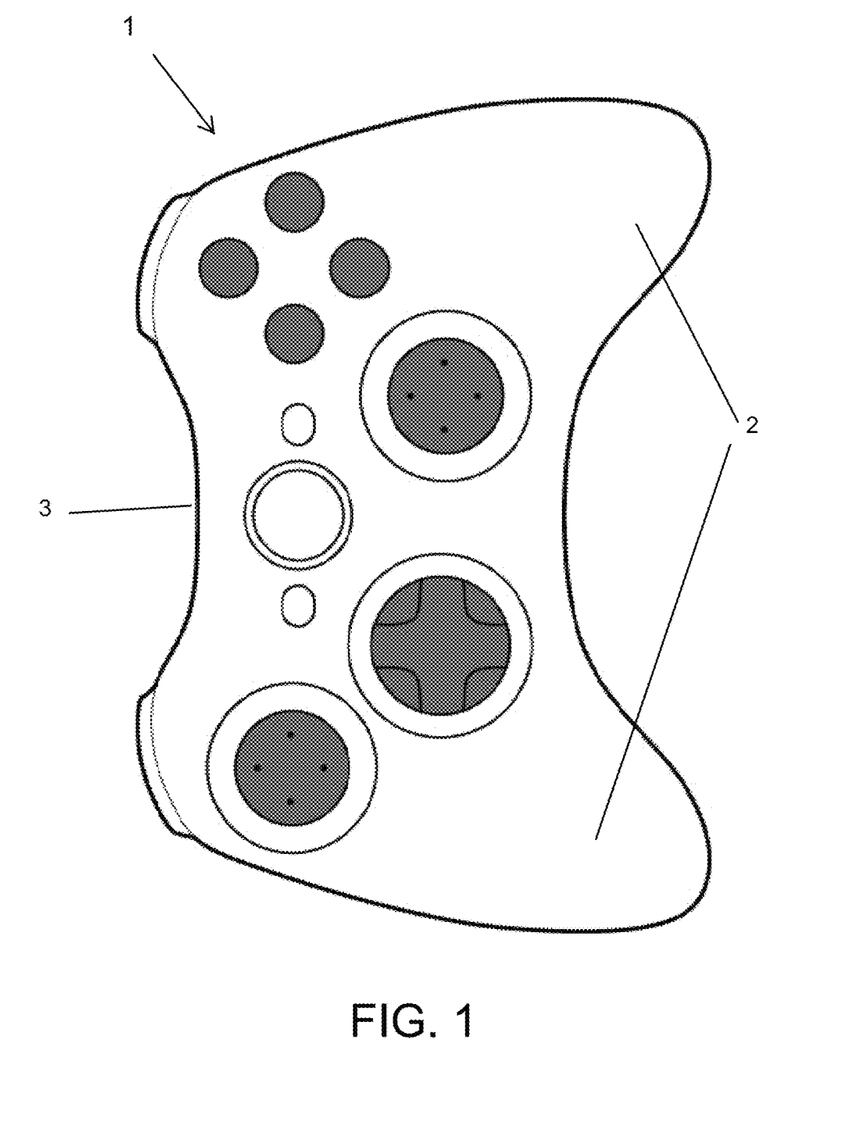
FIG. 1 is a perspective view of a game controller as known in the prior art.

Turning to the figures, FIG. 1 is a perspective view of a controller 1 as presently known in the prior art. Controller 1 comprises two lobes 2 and a top portion 3.

With reference to FIGS. 2-8, the universal controller holster is shown with the first element and the second element in assembled condition. Universal controller holster 100 comprises a first element including two collars 110; arm 120 connecting the two collars 110; a spine 130 extending from the center of arm 120 and having an angled tooth 135 at the end of spine 130 distal from arm 120. Universal controller holster 100 further comprises mount 140 having a plurality of detents 150. Each detent 150 comprises a lip 155. Each detent 150 releasably mates with angled tooth 130. At the end of mount 140 distal from the detents 150 extends an angled support arm 160 having a lip 170 at one end. Clip 180 extends from mount 140. Pass through 190 is disposed on angled support arm 160 which can accommodate wiring. In one embodiment, collars 110 are disposed at a 45° angle to arm 120.

Figures 2, 3:
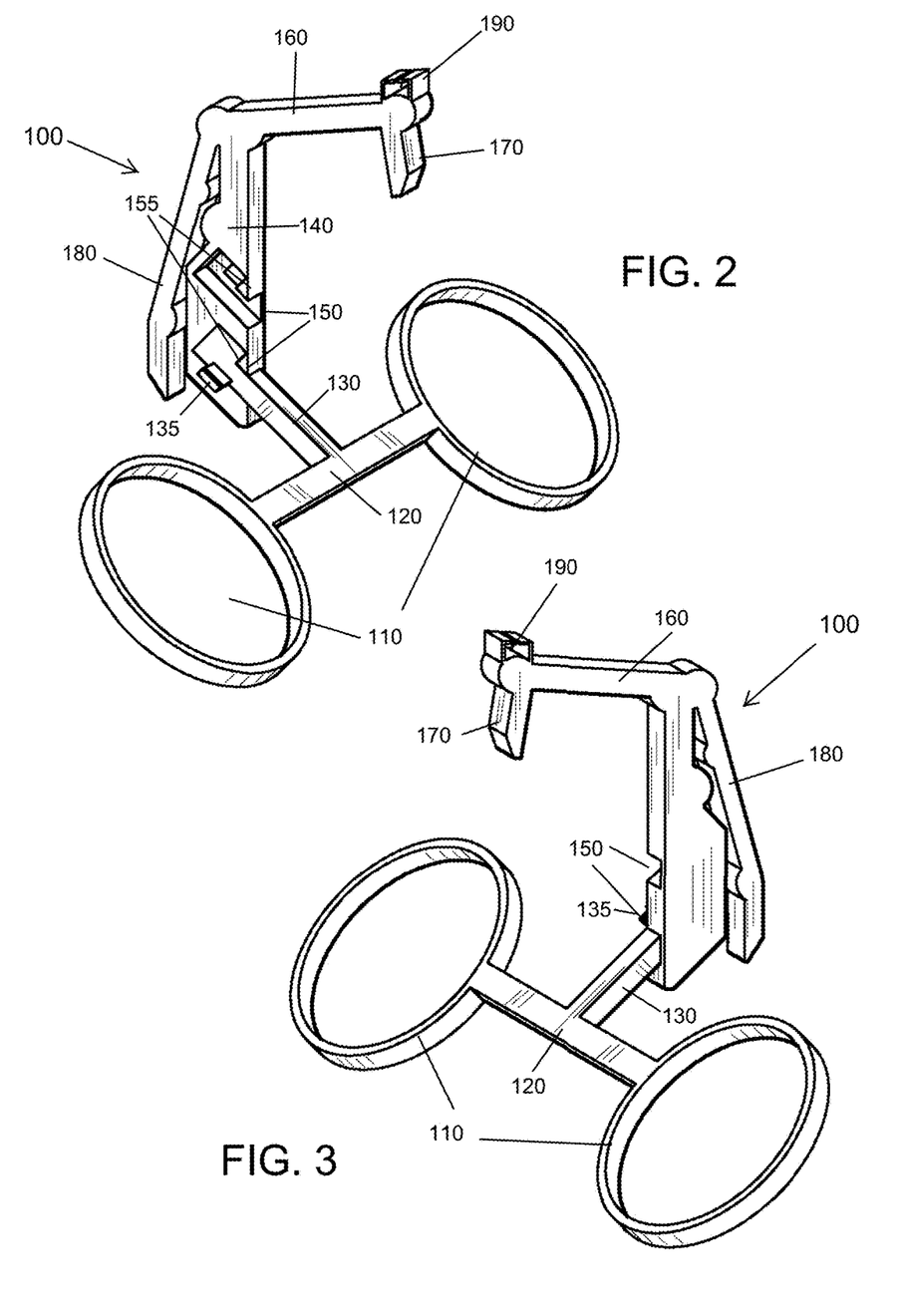
FIG. 2 is a left side perspective view of a universal controller holster in assembled condition.
FIG. 3 is a right side perspective view of the universal controller holster in assembled condition.

FIG. 2 is a left side perspective view of a universal controller holster in assembled condition.

FIG. 3 is a right side perspective view of the universal controller holster in assembled condition.

Figure 4:
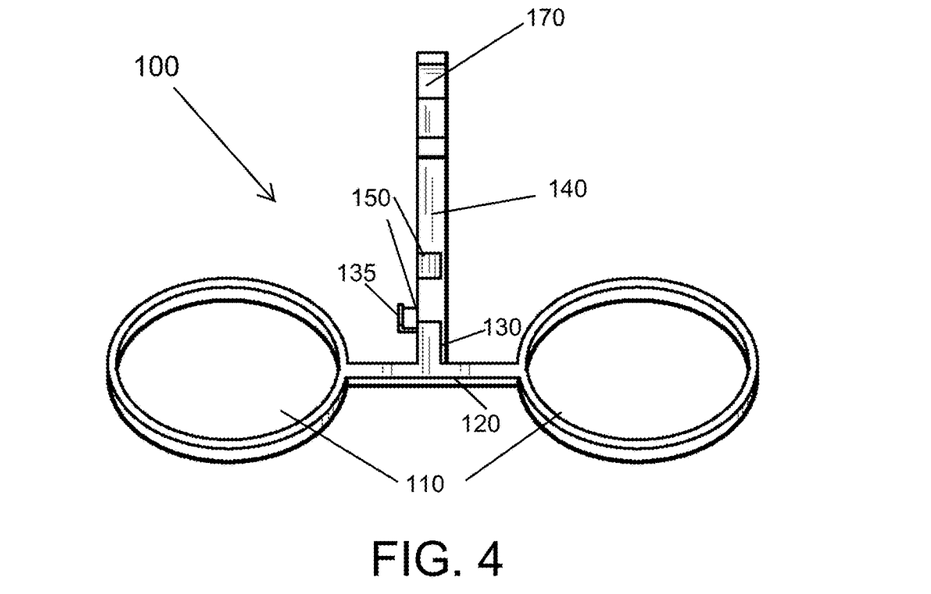
FIG. 4 is a front view of the universal controller holster in assembled condition.

FIG. 4 is a front view of the universal controller holster in assembled condition.

Figure 5:
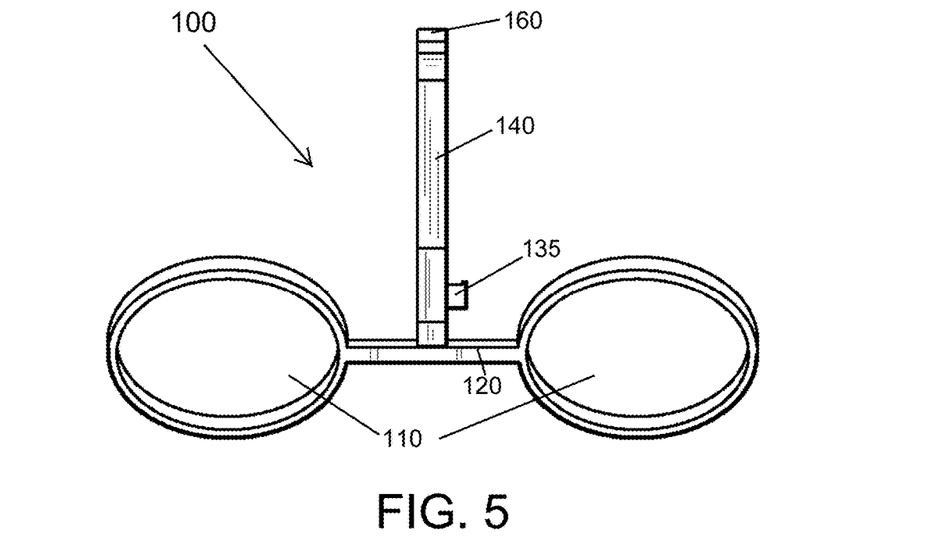
FIG. 5 is a rear view of the universal controller holster in assembled condition.

FIG. 5 is a rear view of the universal controller holster in assembled condition.

Figures 6, 7:
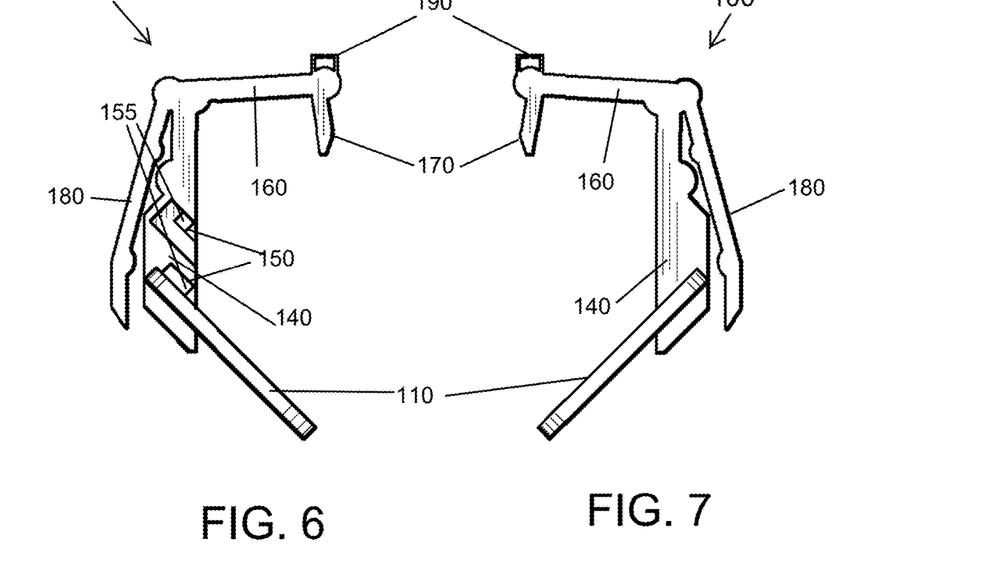
FIG. 6 is a left side view of the universal controller holster in assembled condition.
FIG. 7 is a right side view of the universal controller holster in assembled condition.

FIG. 6 is a left side view of the universal controller holster in assembled condition.

FIG. 7 is a right side view of the universal controller holster in assembled condition.

Figure 8:
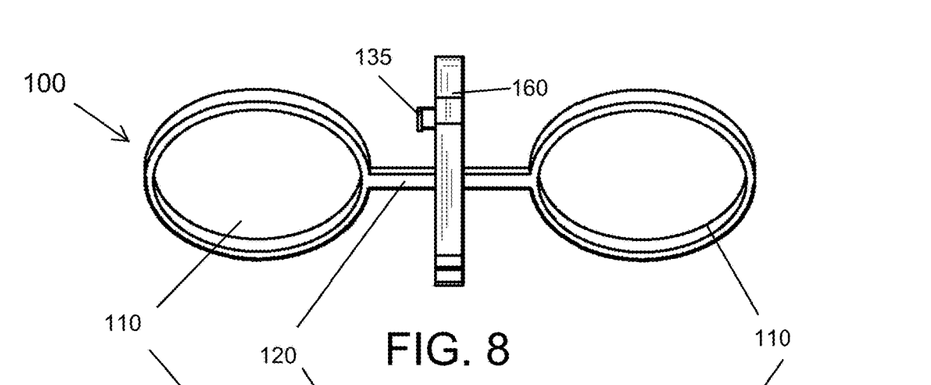
FIG. 8 is a top view of the universal controller holster in assembled condition.

FIG. 8 is a top view of the universal controller holster in assembled condition.

Figure 9:
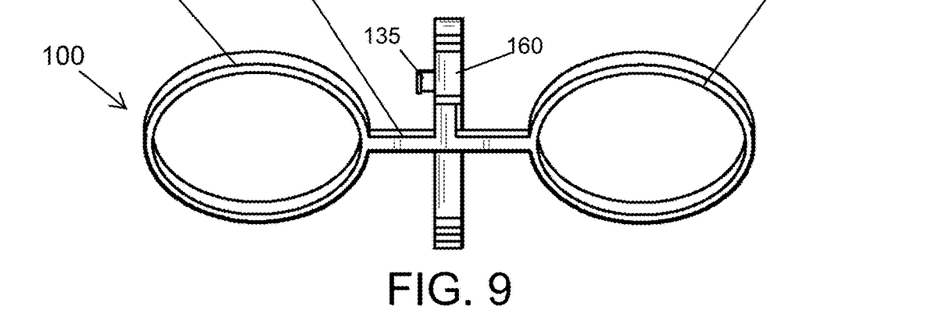
FIG. 9 is a bottom view of the universal controller holster in assembled condition.

FIG. 9 is a bottom view of the universal controller holster in assembled condition.

Figure 10:
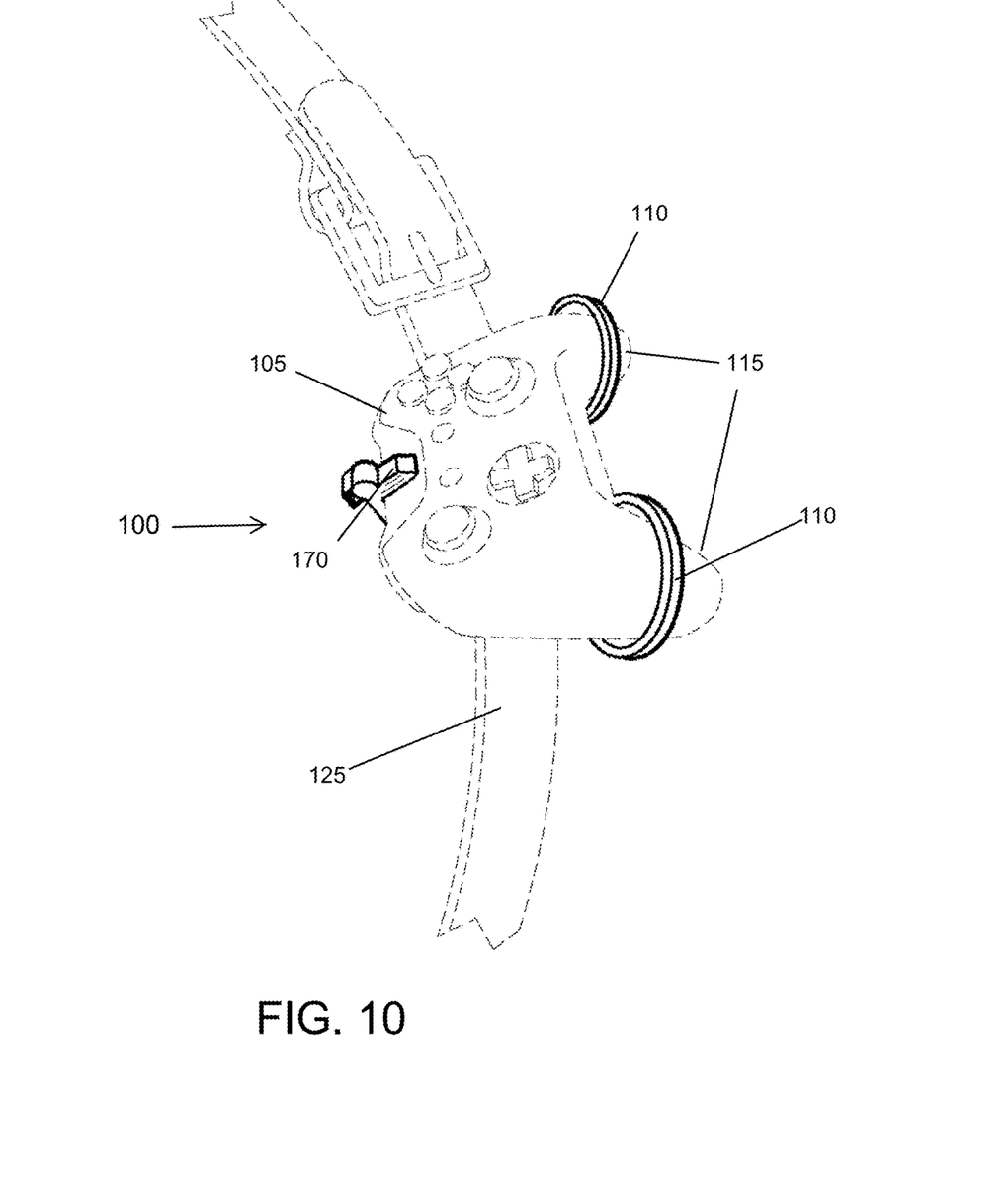
FIG. 10 is a perspective view of the universal controller holster in assembled condition as used by a user to hold a controller.

FIG. 10 depicts the universal controller holster 100 holding a game controller 105. Lobes 115 of game controller 105 are inserted into collars 110. Lip 170 holds the top of game controller 105 in position. The height of mount 140 is adjustable to accommodate different sized game controllers by mating angled tooth 130 with the desired detent 150. As seen in FIG. 10, universal controller holster 100 is attached to the belt 125 of a user by way of clip 180.

FIGS. 11-18 depict the universal controller holster in its unassembled condition. Shown separately are element 1 of universal controller holster 100 comprising two collars 110; arm 120 connecting the two collars 110; a spine 130 extending from the center of arm 120 and having an angled tooth 130 at the end of spine 130 distal from arm 120. FIG. 10 further shows element 2 of universal controller holster 100 comprising mount 140 having a plurality of detents 150, which detents 150 releasably mate with angled tooth 130. At the end of mount 140 distal from the detents 150 extends an angled support arm 160 having a lip 170 at one end. Clip 180 extends from mount 140. Pass through 190 is disposed on angled support arm 160 which can accommodate wiring. In one embodiment, collars 110 are disposed at a 45° angle to arm 120.

Figure 11:
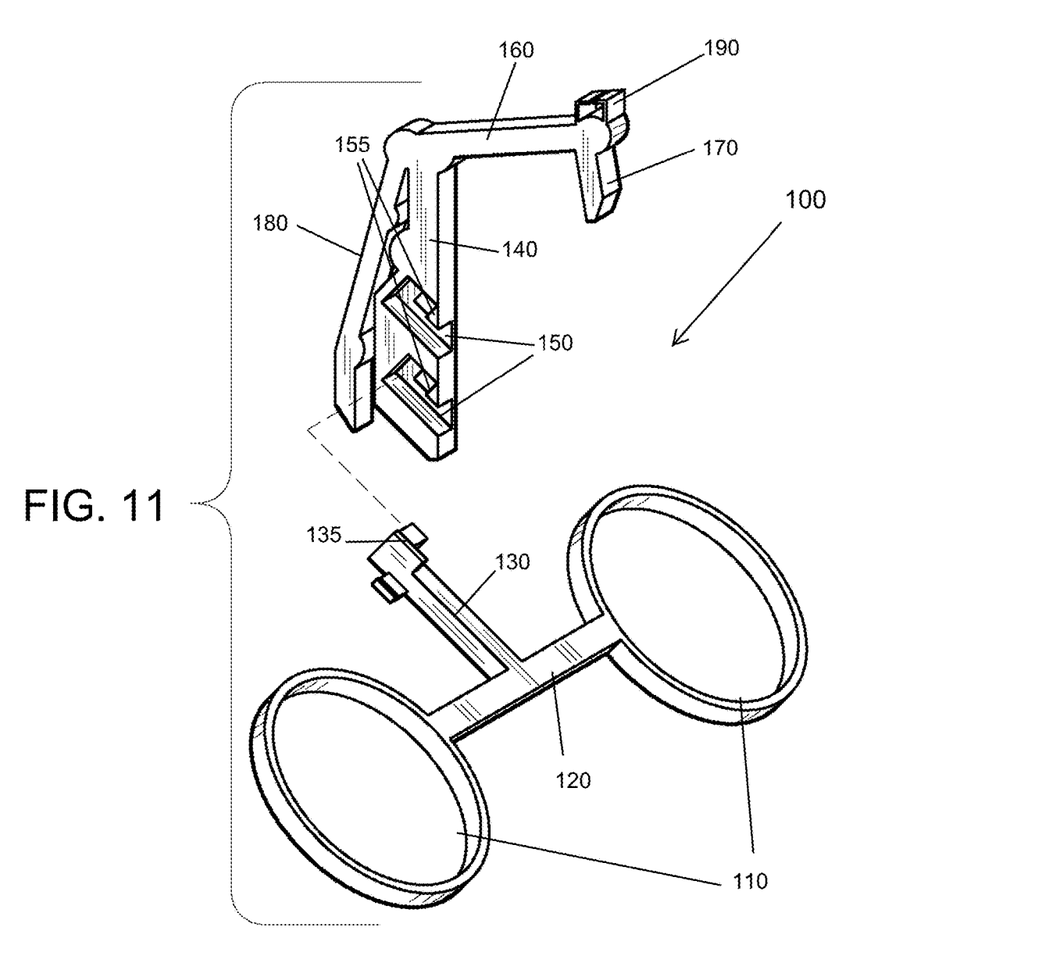
FIG. 11 is a left side perspective view of the universal controller holster in unassembled condition.

FIG. 11 is a left side perspective view of the universal controller holster in unassembled condition.

Figure 12:
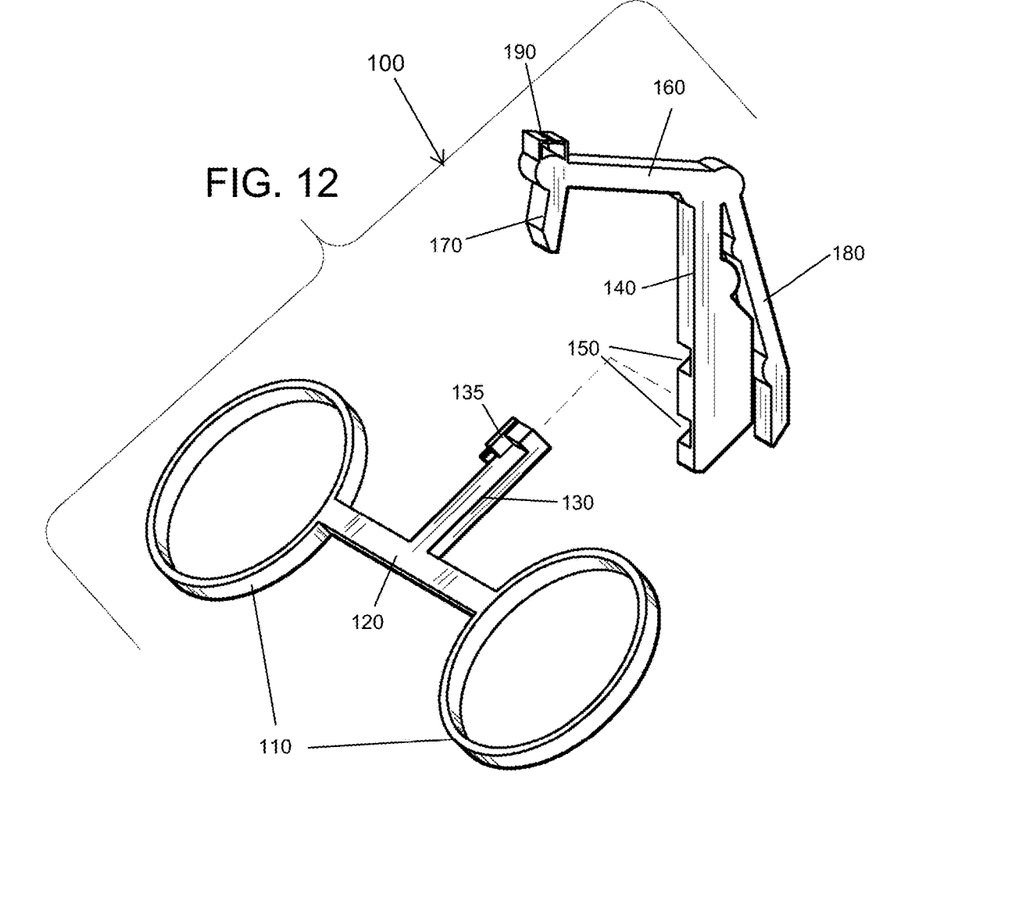
FIG. 12 is a right side perspective view of the universal controller holster in unassembled condition.

FIG. 12 is a right side perspective view of the universal controller holster in unassembled condition.

Figure 13:
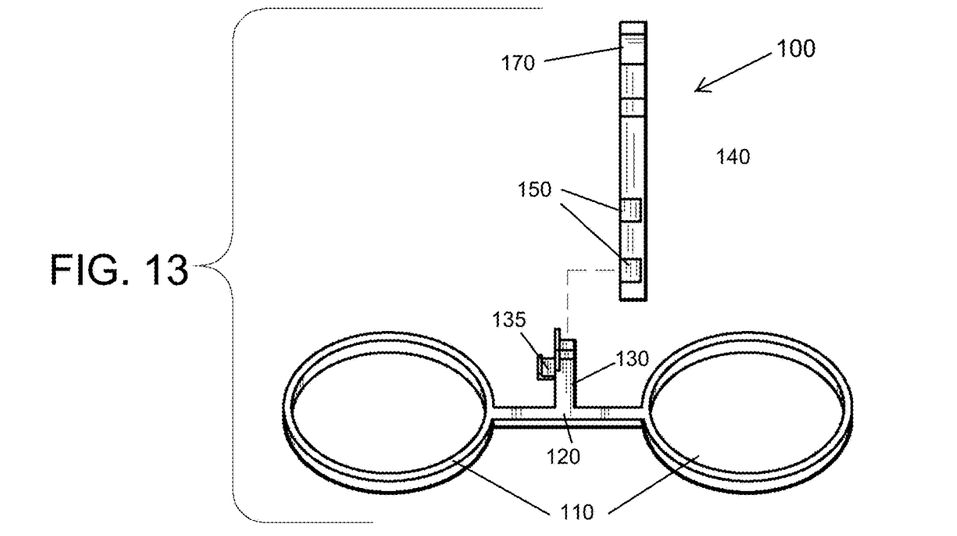
FIG. 13 is a front view of the universal controller holster in unassembled condition.

FIG. 13 is a front view of the universal controller holster in unassembled condition.

Figure 14:
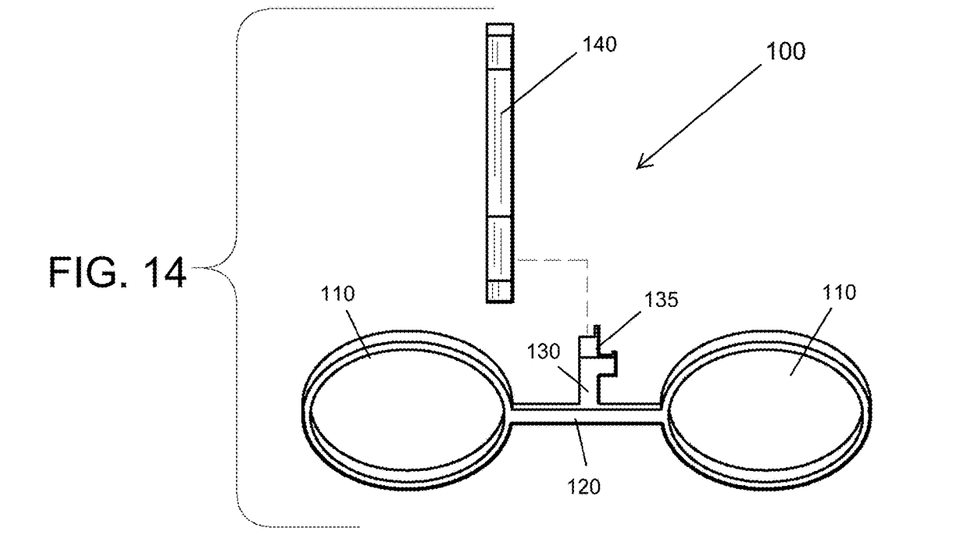
FIG. 14 is a rear view of the universal controller holster in unassembled condition.

FIG. 14 is a rear view of the universal controller holster in unassembled condition.

Figure 15:
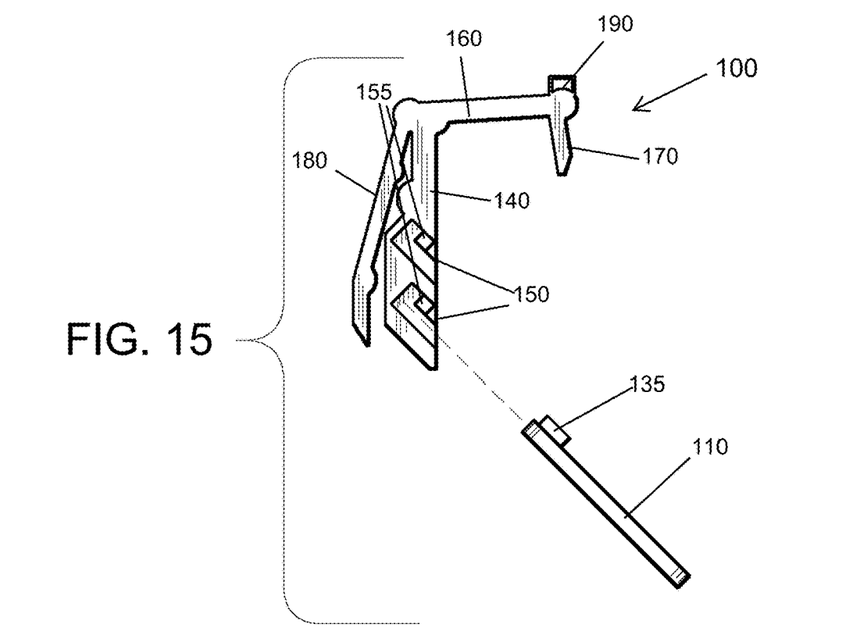
FIG. 15 is a left side view of the universal controller holster in unassembled condition.

FIG. 15 is a left side view of the universal controller holster in unassembled condition.

Figure 16:
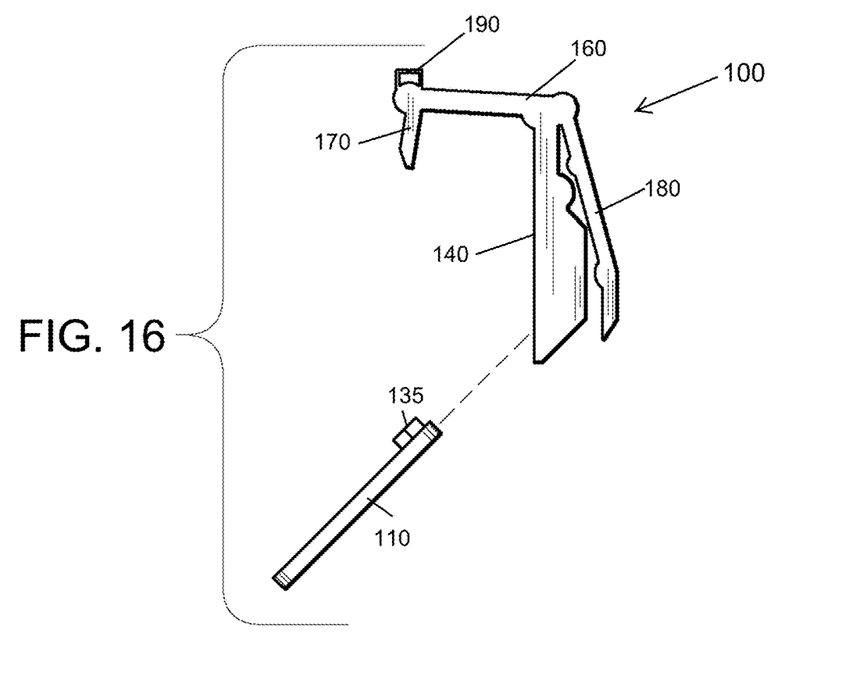
FIG. 16 is a right side view of the universal controller holster in unassembled condition.

FIG. 16 is a right side view of the universal controller holster in unassembled condition.

Figure 17:
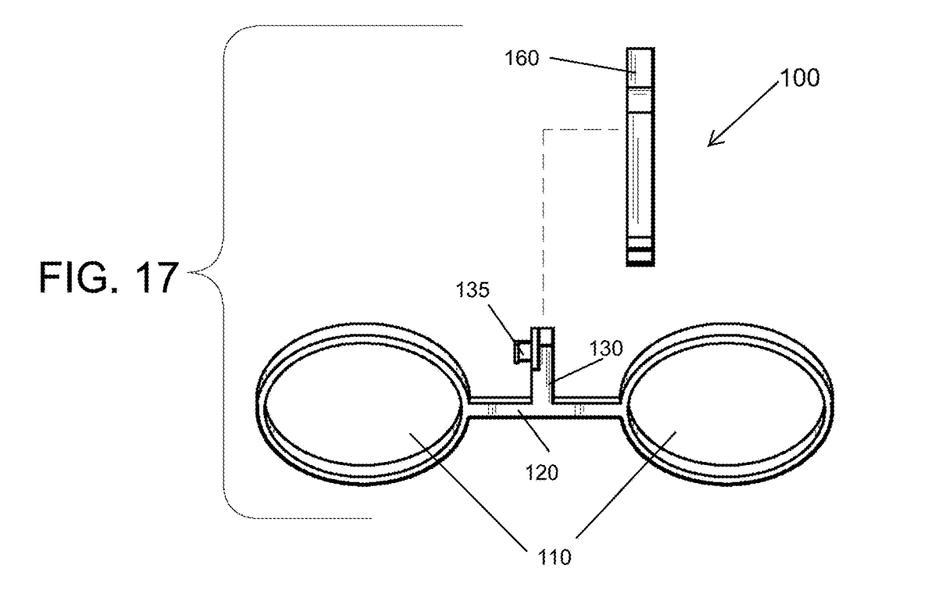
FIG. 17 is a top view of the universal controller holster in unassembled condition.

FIG. 17 is a top view of the universal controller holster in unassembled condition.

Figure 18:
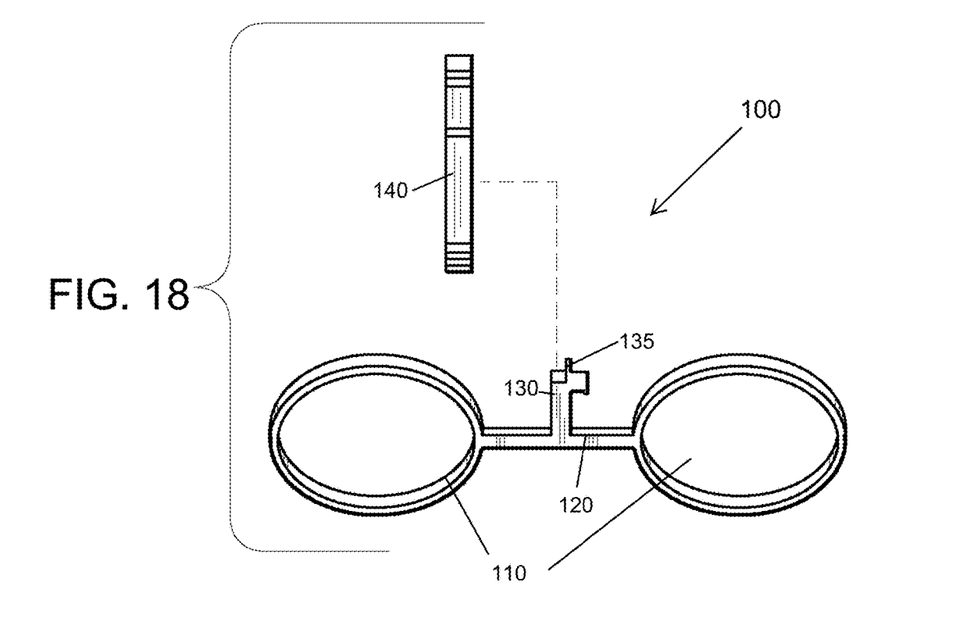
FIG. 18 is a bottom view of the universal controller holster in unassembled condition.

FIG. 18 is a bottom view of the universal controller holster in unassembled condition.

Figure 19A:
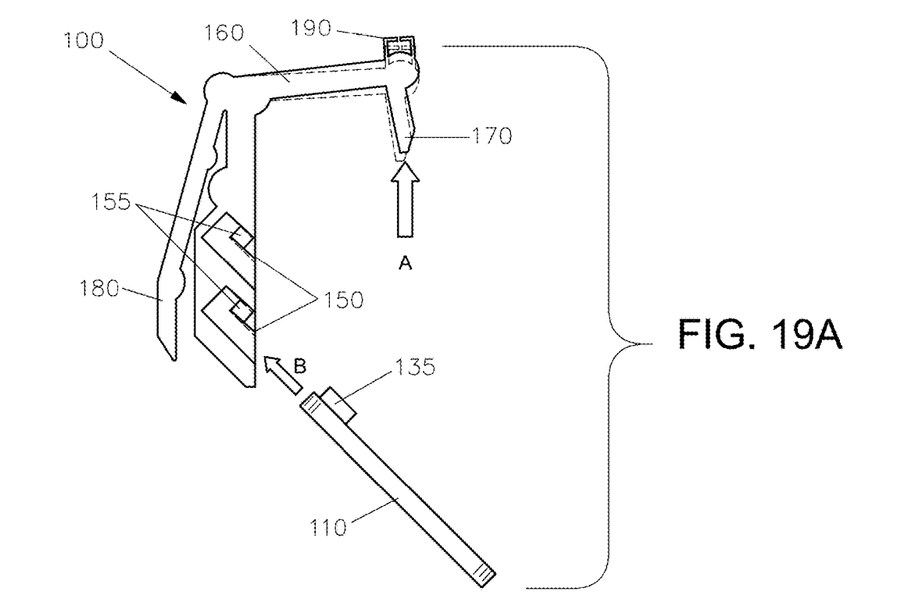
FIGS. 19A and 19B are views of the universal controller holster showing to insert and remove the angled tooth from a detent.
Figure 19B:
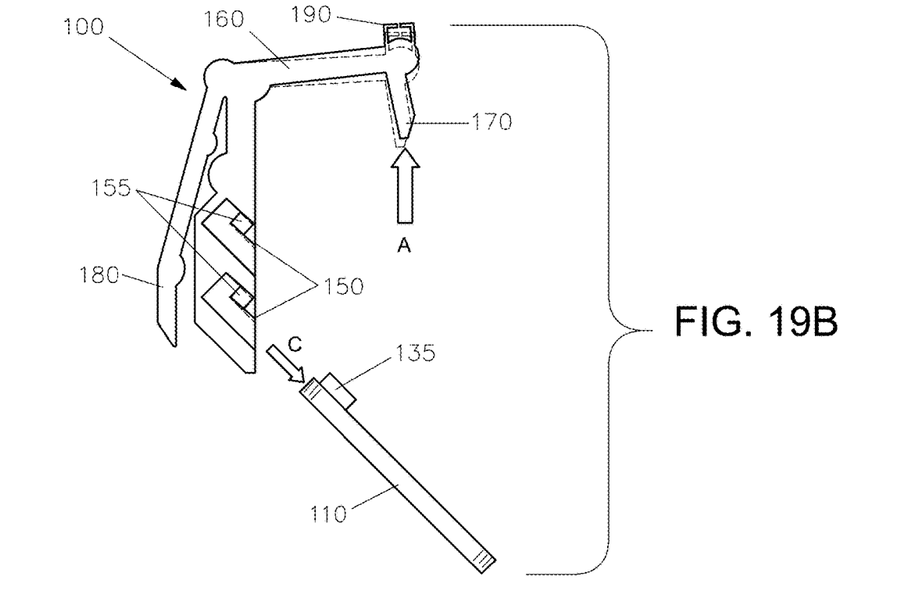

FIGS. 19A and 19B are views of the universal controller holster 100 showing application of a force A to insert (B) and remove (C) angled tooth 130 from detent 150. As seen in FIG. 19A, force placed on lip 170 in the direction shown by arrow A causes detents 150 to open slightly from an initial position as shown in dotted lines to an open position shown in solid lines, allowing insertion as shown by arrow B of angled tooth 135 into detent 150 as shown in dotted lines to a final position shown in solid lines. Release of the force shown by arrow A on lip 170 causes lip 155 to retract to its initial position shown in dotted lines, releasably securing angled tooth 135 in the desired detent 150.

As seen in FIG. 19B, angled tooth 135 can be removed from detent 150 by placing a force on lip 170 in the direction shown by arrow A, causes detents 150 to open slightly from an initial position as shown in dotted lines to an open position shown in solid lines, allowing removal as shown by arrow C of angled tooth 135 from detent 150 as shown in dotted lines to a final position shown in solid lines. Release of the force shown by arrow A on lip 170 causes lip 155 to retract to its initial position shown in dotted lines.

While the invention has been described with reference to a particular embodiment and application, numerous variations and modifications could be made thereto by those skilled in the art without departing from the spirit and scope of the invention as claimed. Accordingly, the scope of the invention should be determined with reference to the claims.

What is claimed is:
1. A universal controller holster comprising:
a first element comprising:
two collars;
an arm connecting the two collars;
a spine extending from the center of arm; and
an angled tooth disposed at the end of the spine distal from the arm; and
a second element comprising:
a mount, the mount comprising a plurality of detents substantially to one end of the mount, each detent having an opening on the side of the mount proximal to the spine that is smaller in size than the angled tooth;
an angled support arm extending from the end of the mount distal from the detents;
a lip extending at an angle from the angled support arm;
a pass-through conduit disposed on the top of the angled support arm; and
a clip extending from the mount,
wherein the angled tooth of the first element releasably mates with one of the detents of the mount to attach the spine to the mount,
wherein the lip extends downward from the angled support arm toward the first element.

2. The universal controller holster of claim 1, wherein the collars are disposed at a substantially 45° angle in relationship to the arm.

3. The universal controller holster of claim 1, wherein the mount comprises a deformable material of construction.

4. The universal controller holster of claim 3, wherein the material of construction comprises acrylonitrile butadiene styrene.

5. The universal controller holster of claim 3, wherein a force placed on the lip in a direction away from the mount causes the opening of each detent to temporarily increase to a size larger than the angled tooth, wherein release of the force causes the opening of each detent to return to a size smaller than the angled tooth.

6. The universal controller holster of claim 1, further comprising a frame disposed on the top of the angled support arm proximal the lip for releasably securing wiring to the universal controller holster.

7. A universal controller holster comprising:
a first element comprising:
two collars;
an arm connecting the two collars;
a spine extending from the center of arm; and
an angled tooth disposed at the end of the spine distal from the arm; and
a second element comprising:
a mount, the mount comprising a plurality of detents substantially to one end of the mount, each detent having an opening on the side of the mount proximal to the spine that is smaller in size than the angled tooth, wherein the mount comprises a deformable material of construction;
an angled support arm extending from the end of the mount distal from the detents;
a lip extending at an angle from the angled support arm; and
a clip extending from the mount,
wherein the angled tooth of the first element releasably mates with one of the detents of the mount to attach the spine to the mount,
wherein the lip extends downward from the angled support arm toward the first element,
wherein a force placed on the lip in a direction away from the mount causes the opening of each detent to temporarily increase to a size larger than the angled tooth, wherein release of the force causes the opening of each detent to return to a size smaller than the angled tooth.

8. The universal controller holster of claim 7, wherein the collars are disposed at a substantially 45° angle in relationship to the arm.

9. The universal controller holster of claim 7, further comprising a pass-through conduit disposed on the top of the angled support arm.

10. The universal controller holster of claim 7, wherein the material of construction comprises acrylonitrile butadiene styrene.

11. The universal controller holster of claim 7, further comprising a frame disposed on the top of the angled support arm proximal the lip for releasably securing wiring to the universal controller holster.

12. A universal controller holster comprising:
a first element comprising:
two collars;
an arm connecting the two collars;
a spine extending from the center of arm; and
an angled tooth disposed at the end of the spine distal from the arm; and
a second element comprising:
a mount, the mount comprising a plurality of detents substantially to one end of the mount, each detent having an opening on the side of the mount proximal to the spine that is smaller in size than the angled tooth;
an angled support arm extending from the end of the mount distal from the detents;
a lip extending at an angle from the angled support arm; and
a clip extending from the mount,
wherein the angled tooth of the first element releasably mates with one of the detents of the mount to attach the spine to the mount,
further comprising a frame disposed on the top of the angled support arm proximal the lip for releasably securing wiring to the universal controller holster.

13. The universal controller holster of claim 12, wherein the collars are disposed at a substantially 45° angle in relationship to the arm.

14. The universal controller holster of claim 12, further comprising a pass-through conduit disposed on the top of the angled support arm.

15. The universal controller holster of claim 12, wherein the mount comprises a deformable material of construction.

16. The universal controller holster of claim 15, wherein the material of construction comprises acrylonitrile butadiene styrene.

17. The universal controller holster of claim 15, wherein a force placed on the lip in a direction away from the mount causes the opening of each detent to temporarily increase to a size larger than the angled tooth, wherein release of the force causes the opening of each detent to return to a size smaller than the angled tooth.

* * * * *